United States Patent Office 3,309,335
Patented Mar. 14, 1967

3,309,335
POLYESTER COATING MATERIALS
Henry M. Walton, Decatur, Ill., assignor to A. E. Staley Manufacturing Company, Decatur, Ill., a corporation of Delaware
No Drawing. Filed Feb. 20, 1963, Ser. No. 260,073
19 Claims. (Cl. 260—40)

This invention relates to a room-temperature-air-drying coating composition suitable for giving wood and metal surfaces a mar-resistant high-luster or flatted finish. More particularly, this invention is directed to a polyester lacquer composition comprising a monovinyl aromatic compound and a polyester of an alpha, beta-ethylenically unsaturated alpha, beta-dicarboxylic acid, a monohydric alcohol selected from the group consisting of tetrahydro-furfuryl alcohol and tetrahydro-pyranyl-2-methanol, a polyoxyethylene glycol having from 2–5 ether groups and a polyhydric alcohol containing at least 3 hydroxyl groups.

Polyester lacquers (a mixture of a polyester and an ethylenically unsaturated monomer) have been used for several years, primarily in Europe, to finish wood with a high gloss. As pointed out in the May 1960 issue of Paint Manufacturer, at pages 161–165 and 170, atmospheric oxygen has a deleterious effect on the drying of these lacquers, which often results in a more or less tacky and/or soft finish. Of course, lacquers, which give tacky and/or soft finishes are not commercially acceptable.

One commercial solution to this problem has been the incorporation of a small amount of waxy or paraffinic material into the lacquer composition. As the lacquer cures, the waxy or paraffinic material becomes incompatible with the lacquer and is forced to the exposed surface of the lacquer layer, and forms an impervious layer through which atmospheric oxygen is unable to penetrate. While this waxy or paraffinic layer prevents atmospheric oxygen from inhibiting the complete cure of the lacquer layer, the waxy layer presents several disadvantages. The waxy layer imparts a dull, speckled unattractive appearance to the wood. Accordingly, the waxy layer must be removed either by polishing or sanding in order to give the wood furniture the glossy appearance desired. Polyester lacquers, which contain wax, cannot be compounded with flatting agents or pigments, since the wax does not operate reliably in this environment. Accordingly, flatted finishes, which are prefered in the United States, cannot be prepared with this type of polyester system. Further, a second coat of lacquer does not adhere well to the first coat unless the waxy layer is completely and thoroughly removed from the surface of the first coat prior to the application of the second coat of polyester lacquer.

British Patent 810,222 states: "It is true that in the use of a special group of unsaturated polyesters as copolymerization component, i.e., those containing oxygen in an ether linkage, for example, of the types built up with the aid of di- or triethylene glycol, the inhibiting effect of atmospheric oxygen does not occur at temperatures above about 100° C. At lower hardening temperatures, particularly at room temperature, no hardening effect can be observed at places which are in contact with air, even with mixtures containing these polyesters." This patent discloses the incorporation into the polyester of large concentrations of allyloxy monohydric or dihydric alcohols (e.g., pentaerythritol diallyl ether), which act as oxygen scavengers. The patent goes on to say that since the polyester contains two types of ethylenic unsaturation (from the allylic groups and from the alpha, beta-ethylenically unsaturated dicarboxylic acid), gelation, which cannot be eliminated by polymerization inhibitors or the exclusion of air, is a distinct risk during the formation of the polyester itself. My work has shown that polyesters, which contain a sufficient concentration of allyloxy groups to impart the necessary air-drying properties, cannot be compounded with a flatting agent to form a storage-stable, flatted polyester lacquer.

British Patent 821,988 indicates that polyester lacquer compositions composed of vinyl aromatic monomers and polyesters of polyhydric aliphatic alcohols containing from 2 to 5 ether oxygen atoms in a molecule and suitable alpha, beta-ethylenically unsaturated dicarboxylic acids yield tack-free coatings, which are not inhibited by atmospheric oxygen. The examples in this patent, particularly Example 2, indicate that the coatings dry dust-free in about 6 hours. My studies have shown that lacquers based on homopolymeric triethylene glycol fumarate yield the hardest and fastest drying lacquers. In general, as the chain length of the polyoxyalkylene glycol increases, either due to the presence of more than 2 ether groups in the polyoxylalkylene glycol or the use of a polyoxyalkylene glycol having more than 2 carbon atoms in the alkylene chain, the hardness of the cured polyester lacquer decreases and rate of cure in the presence of atmospheric oxygen decreases. In fact, polyesters based on polyoxypropylene glycols are inhibited by atmospheric oxygen.

However, homopolymeric triethylene glycol fumarate (or maleate) as well as some of the other homopolymeric polyoxyethylene glycol fumarates cannot be formulated with styrene into a typical commercially acceptable polyester lacquer (e.g., 70 parts polyester and 30 parts styrene) having a storage life of at least six months since homopolymeric triethylene glycol fumarate tends to precipitate or crystallize out of the lacquer on standing at room temperature. This tendency to precipitate out of styrene increases as the temperature of the polyester lacquer drops. Likewise, fluctuations in the temperature of the polyester lacquer hastens precipitation of the homopolymeric triethylene glycol fumarate. In some cases, freshly prepared polyesters, which have been compounded with styrene and then shipped a few hundred miles by freight, have reached their destination in a solidified condition.

U.S. Patent 2,532,498 states that a similar problem resulting from the precipitation of homopolymeric ethylene glycol fumarate (or maleate) from an organic solvent or copolymerizable monomer could be alleviated to a large extent by replacing from ⅓ to ⅔ of the molar concentration of ethylene glycol with propylene glycol. The patentee indicates that propylene glycol is the only glycol which could be used in a concentration sufficient to alleviate the incompatibility of the polyester with organic solvents or copolymerizable monomers without sacrificing the desirable characteristics of the polyester.

While triethylene glycol fumarate polyesters can be prevented from precipitating out of polyester lacquer compositions by modifying the polyester with a substantial concentration (in excess of about 25 mole percent) of various glycols and/or dicarboxylic acids, these materials cannot be used in quantities sufficiently large to prevent this precipitation without the loss of the room-temperature-air-drying properties or hardness and mar-resistance (or both), and other desirable properties. The replacement of more than about 10 mole percent fumaric acid by a saturated dicarboxylic acid (aromatic, aliphatic, cycloaliphatic, etc.) results in a relatively soft or brittle coating. The coatings become soft on the addition of aliphatic dicarboxylic acids, such as adipic acid, and brittle on the addition of cyclic dicarboxylic acids such as phthalic acid. Further, cyclic dicarboxylic acids seem to reduce the adhesion of the cured polyester to various substrates, particularly to wood. The replacement of more than 10 mole percent triethylene glycol by a non-ether containing glycol yields a polyester whose air-curing properties are somewhat deficient.

The principal object of this invention is to provide polyesters which can be prepared easily without any possibility of the polyester gelling during the esterification reaction and which can be formulated with vinyl aromatic compounds such as styrene to form stable, flatted, non-air inhibited, room-temperature-curing lacquers that copolymerize to form hard, mar-resistant coatings.

I have now found that I can accomplish the objects of my invention by providing a polyester of (I) dicarboxylic acid, (II) monohydric alcohol, which provides from about 0.5 to 15 percent of the hydroxyl groups available for esterification, (III) dihydric alcohol, which provides from 65 to 97.5 percent of the hydroxyl groups available for esterification, and (IV) polyhydric alcohol containing at least three hydroxyl groups, which provide from 2 to 20 percent of the hydroxyl groups available for esterification, wherein (1) said dicarboxylic acid comprises at least 80 mole percent of an alpha, beta-ethylenically unsaturated alpha, beta-dicarboxylic compound, (2) said monohydric alcohol comprises a compound selected from the group consisting of tetrahydrofurfuryl alcohol and tetrahydropyranyl-2-methanol and (3) at least 75 mole percent of said dihydric alcohol conforms to the structure $HO(CH_2CH_2O)_nH$ wherein $n$ is a number from 3 to 6 inclusive.

I am aware that the partial replacement of glycols by polyhydric alcohols having more than two free hydroxyl groups is often suggested in the patent literature as a means of modifying polyesters. However, air-drying polyesters are rarely modified in this manner since (1) such polyesters, which do not precipitate from styrene, generally are progressively less compatible with styrene as the concentration of polyhydric alcohol having at least three free hydroxyl groups is increased, (2) cured polyester lacquers are often undesirably brittle and lack adhesion to the substrate and (3) the polyester has a markedly increased viscosity, which is considered undesirable in this art. In general, the viscosity of a polyester lacquer is determined by the method by which the polyester lacquer is to be applied. Accordingly, viscous polyesters must be compounded with more monovinyl aromatic compound (styrene) to form a lacquer having the necessary low viscosity. While the use of a large concentration of styrene is economically attractive, the art has avoided this method of modification since as the concentration of styrene in a polyester lacquer increases, the rate of cure of the polyester lacquer decreases. This decrease in rate of cure (or increase in dust dry time) may be another form of air inhibition. Surprisingly, when a polyester lacquer based on a polyester of my invention (for example, triethylene glycol, fumaric acid, tetrahydrofurfuryl alcohol and trimethylol ethane) and a polyester lacquer based on a comparable homopolymeric polyester (for example, homopolymeric triethylene glycol fumarate) were diluted with sufficient styrene to give both lacquers the same viscosity, the polyester lacquer of my invention (1) cures to a dust-dry finish much more rapidly than the homopolymeric triethylene glycol fumarate lacquer and (2) the cured coating is markedly more mar-resistant. Generally, the polyesters of my invention require about 10 parts additional styrene per 70 parts of polyester in order for the polyester lacquer to have about the same viscosity as the homopolymeric polyester.

In order to accomplish all the objects of my invention both tetrahydrofurfuryl alcohol (or tetrahydropyranyl-2-methanol) and polyhydric alcohol having at least three free hydroxyl groups are essential. In the absence of the tetrahydrofurfuryl alcohol, a polyester based solely on triethylene glycol, fumaric acid and a polyhydric alcohol having at least three free hydroxyl groups will precipitate from styrene during cold storage. Compositions of this type have set up completely in about two weeks. Further, in the absence of the monohydric alcohol, the polyester's higher viscosity is a serious problem requiring additional styrene which results in a slower cure.

While various other monohydroxy compounds can be used in place of tetrahydrofurfuryl alcohol or tetrahydropyranyl alcohol in order to reduce the viscosity of the polyester, the polyester lacquer has poorer air-drying properties than if the polyester contained a cyclic ether alcohol. This is due to the tetrahydrofurane ring of tetrahydrofurfuryl alcohol and the tetrahydropyrane ring of tetrahydropyranyl-2-methanol which are extremely active autoxidizable groups and prevent oxygen inhibition of the cure. Other autoxidizable monohydroxy compounds, such as ethyl carbitol and diallyloxytrimethylol propane, yield polyesters whose lacquers do not cure as rapidly as when tetrahydrofurfuryl alcohol or tetrahydropyranyl-2-methanol has been employed. Further, polyester lacquers, including either diallyloxytrimethylol propane or ethyl carbitol with fumaric acid, triethylene glycol and a polyhydric alcohol having at least three free hydroxyl groups, have set up on cold storage in about two weeks to a month. However, when maintained continuously at room temperature they have remained stable for as long as two years.

On the other hand, a polyester based solely on triethylene glycol, fumaric acid and monohydric alcohol cannot be prepared conveniently with both a sufficiently high viscosity and cold storage stability in styrene.

In effect, the polyhydric alcohol, having at least three free hydroxyl groups, has the following functions in a polyester based on triethylene glycol and fumaric acid: (1) retards the tendency of the polyester to precipitate from styrene or other vinyl aromatics, (2) increases the viscosity of the polyester so that a monohydric alcohol can be incorporated into the polyester backbone and (3) increases the mar-resistance of the cured polyester. On the other hand, the monohydric alcohol (1) acts in conjunction with the polyhydric alcohol, to prevent the polyester from precipitating from styrene on storage, (2) acts in conjunction with the polyhydric alcohol to give the polyester the proper viscosity, (3) acts in conjunction with the polyhydric alcohol to increase the mar-resistance of the cured polyester and to reduce the dust dry time of the polyester, (4) acts as an autoxidizable group which helps prevent the inhibition of the polyester lacquer by atmospheric oxygen, and (5) permits the partially cross-linked (by the polyhydric alcohol) polyester to be diluted with a larger concentration of vinyl aromatic compound.

As pointed out above, the polyoxyethylene glycols which may be used in this invention conform to the structure $HO(CH_2CH_2O)_nH$ wherein $n$ is a number from 3 to 6. These glycols include triethylene glycol, tetraethylene glycol, pentaethylene glycol and hexaethylene glycol. Triethylene glycol is preferred since polyesters based on it have the best air-drying properties, form harder, more mar-resistant coatings and are the least water-sensitive of the polyesters based on this class of polyoxyalkylene glycols. However, one or more of the other polyoxyethylene glycols may be used where a softer coating is desired. Up to about 25 mole percent of the glycol component of the polyester may be replaced by a glycol such as ethylene glycol, diethylene glycol, 1,2-propylene glycol, 1,3-butylene glycol, 1,4-butylene glycol, dimethylol cyclohexane, etc., without undue loss of the polyesters' basic properties.

Suitable polyhydric alcohols containing at least three free hydroxyl groups include trimethylol ethane, trimethylol propane, glycerol, 1,2,6-hexanetriol, pentaerythritol monomethyl ether, pentaerythritol monooctyl ether, hydrogenated castor oil, pentaerythritol, methyl glucoside, sorbitol, etc. In general, trihydric alcohols are preferred since the viscosity of the polyester does not build up quite as rapidly during the esterification reaction as when a polyhydric alcohol having four or more hydroxyl groups is employed. Of the various trihydric alcohols, trimethylol ethane and trimethylol propane are preferred since they can be esterified readily and none of their hydroxyl groups is sterically hindered.

Polyhydric alcohols having more than three free hydroxyl groups, such as pentaerythritol, also tend to produce polyesters that have reduced adhesion to wood and other substrates. However, condensation products of an alkylene oxide, such as ethylene oxide or propylene oxide with pentaerythritol, sorbitol and other higher polyols do not adversely affect the adhesion of the polyester lacquer to wood or other substrates.

While the polyhydric alcohol of this invention may furnish from about 2 to 20 equivalent percent of the hydroxyl groups available for esterification, its concentration is dependent upon the concentration of the monohydroxy alcohol and the desired viscosity of the polyester. The ratio of equivalents of polyol to monohydric alcohol can advantageously range from about 8:1 to 1:1. Generally, proportions at the 8:1 end of the range are most desirable when only a small combined concentration of polyol and monohydroxy compound are employed, while proportions approaching unity are most desirable when a high concentration of polyol is employed. In this way, the viscosity of the polyester is kept in a desired range.

Tetrahydrofurfuryl alcohol is the preferred monohydric alcohol because of its availability and low cost. Further, polyesters based on tetrahydrofurfuryl alcohol have somewhat better mar-resistance than those based on tetrahydropyranyl-2-methanol.

Various other monohydroxy compounds, such as the diallyl ether of trimethylol propane, ethyl carbitol and stearyl alcohol, can be used to supplement the tetrahydrofurfuryl alcohol or tetrahydropyranyl-2-methanol just so the tetrahydrofurfuryl alcohol or tetrahydropyranyl-2-methanol provides at least 0.5 equivalent percent of the total number of hydroxyl groups available for polyesterification.

As indicated above, at least 80 mole percent of the dicarboxylic acid component used to prepare the polyester of my invention must be alpha, beta-ethylenically unsaturated alpha, beta-dicarboxylic acids. Otherwise, the polyester lacquer, when cured is undesirably soft, and/or brittle. Fumaric acid is by far the preferred alpha, beta-ethylenically unsaturated alpha, beta-dicarboxylic acid component since the higher the concentration of fumaric acid the better the air-drying properties of the polyester lacquer. However, from a cost point of view, it is often desirable to replace part of the fumaric acid with maleic acid or with maleic anhydride. However, large concentrations of maleic anhydride and maleic acid must be employed with extreme care lest the polyester gel during the condensation reaction.

Other dicarboxylic acids may comprise up to about 20 mole percent of the dicarboxylic acids available for polyesterification. Suitable dicarboxylic acids include condensation products of alpha, beta-ethylenically unsaturated alpha, beta-dicarboxylic acids (maleic anhydride or fumaric acid) with dienophiles, such as anthracene, butadiene, cyclopentadiene and dicyclopentadiene; adipic acid, sebacic acid, phthalic anhydride, tetrahydrophthalic anhydride, endomethylene-tetrahydrophthalic anhydride, isophthalic acid, itaconic acid, etc. If desired, any of the above dienophiles may be reacted with up to about 20 mole percent of the dicarboxylic acid moieties in the condensed polyester where all of the dicarboxylic acid components in the polyester are alpha, beta-ethylenically unsaturated alpha, beta-dicarboxylic acid moieties.

In the preparation of the unsaturated polyester component, the amount of hydroxyl compound is generally chosen to give approximate equivalency, or a slight excess over such equivalency, as to the sum of the ethylenically unsaturated dicarboxylic acids plus any saturated dicarboxylic acid. Usually the excess of hydroxyl compound over equivalency will not exceed about 10% to 20% and it may be lower. The excess facilitates reduction of the acid number of the resulting polyester.

Esterification is affected in accordance with known methods. Acid catalysts may be added. The reaction should be conducted under a protective, non-oxidizing atmosphere, such as an atmosphere of carbon dioxide or nitrogen gas. Xylene or other non-reactive solvents, which form an azeotrope with water, can be included and the reaction can be conducted by heating the mixture to reaction temperature, e.g. to that temperature at which water is expelled from the system. Heating is usually continued until water ceases to be evolved and until the acid value of the polyester is between about 5 to 50. Generally tetrahydrofurfuryl alcohol and any other monohydric alcohols are added to the polyester reaction vessel after about 75%–100% of the water formed by the glycol condensation reaction has been evolved in order to avoid loss of tetrahydrofurfuryl alcohol. In extreme cases where the tetrahydrofurfuryl alcohol is included in the reaction vessel with dicarboxylic acid, glycol, triol, etc., up to 33% or more of the tetrahydrofurfuryl alcohol may be lost by entrainment in the water as it is evolved. The condensation should not be continued so long as to result in infusibility of the polyester or to give polyesters of such high molecular weight as will prevent the finished composition of the invention from becoming homogeneous, single-phase, cured masses at room temperature. Generally, the polyester should have a molecular weight of between approximately 800 and 5,000.

Usually a temperature of 135° C. to 220° C. and a reaction time of 2 to 20 hours is sufficient to effect esterification. After the desired acid value has been reached, the resulting mass is then cooled to a relatively low temperature, and a polymerization inhibitor is added such as hydroquinone, resorcinol, catechol, tertiary butyl catechol, symmetrical di-beta-naphthylparaphenylene diamine, etc. If desired, the inhibitor may be added during the condensation reaction. The ethylenically unsaturated polyester prepared by any of the methods herein described is then dissolved in a monomeric liquid aromatic vinyl compound which is copolymerizable with the polyester, such as styrene, vinyl toluene, alpha methyl styrene, divinyl benzene, etc. Styrene is by far the most preferred monomeric material because of its low cost and high reactivity with the ethylenic double bonds of the polyester.

Mixtures of any two or more of the herein described copolymerizable vinyl aromatic components may be used. Generally, the monomeric liquid aromatic vinyl compound is present in the compositions of this invention in an amount of from about 15 to 70% and preferably in an amount of from 30 to 60% based on the total weight of the components.

The lacquers obtained by dissolving together the polyester in the monovinyl aromatic compound with or without the appropriate stabilizers, are preferably cured by incorporating conventional curing catalysts in amounts between about 0.1% by weight of the polyester composition and 8%. Suitable peroxidic catalysts which yield radicals initiating polymerization in the presence of metal driers include 1-hydroxy-1-hydroperoxydicyclohexylperoxide, 1,2,3,4-tetrahydronaphthalene-1-hydroperoxide, benzoyl peroxide, cyclohexanone peroxide, cumene hydroperoxide, methyl ethyl ketone peroxide, etc. The preferred driers are the cobalt salts of carboxylic acids which are soluble in the reaction mixture, such as cobalt naphthenate, cobalt maleate, cobalt acetate, cobalt octoate, etc. Other catalyst systems that release free radicals at room temperature are also applicable, such as the combination of tertiary amines (dimethyl aniline or dimethyl toluidine) with peroxides.

These mixtures may also contain pigments and/or fillers according to known practice. As pointed out above, a particular advantage of the polyester lacquers of this invention is that the polyester lacquers are stable when compounded with silica flatting agents such as Syloid 308, 161 or 244, Cab-O-Sil M-6, etc. Generally, the flatting agent is milled into part of the polyester lacquer and then compounded with the other ingredients.

The lacquer compositions may be applied to surfaces which are to be coated by brushing, spraying, or dipping or with a curtain coater. The final copolymerization of the component takes place after applying the lacquer or the coating. They harden readily on the coated surface which can be glass, metal, plastic, wood, paper or textile, to give a completely dry film in a short time at room temperature or at elevated temperature. The components are usually applied without solvent or plasticizer. It is also possible to apply the components separately, in which case the components are first combined on a surface to be coated. It is likewise possible to produce from the components described herein molded bodies having an absolutely dry surface.

If desired, the polyester compositions may also be employed after the addition of suitable catalysts, for the production of coatings which dry at elevated temperatures. Driers are usually unnecessary where curing temperatures in excess of 100° C. are employed.

If desired, ketones, such as benzoin, or other ultraviolet light polymerization catalysts, may be added to the polyester lacquer and an ultra-violet light source used to polymerize the applied coating.

The examples following are merely illustrative and should not be construed as limiting the scope of the invention.

In the examples that follow, reference is made to the Hoffman Scratch hardness of the cured lacquer and the age thereof. In this test, the Hoffman Scratch hardness drops rapidly during the first few days after the film has been cured and reaches a relatively constant value when the film is about 20 days old.

*Example I*

Six hundred and sixty-five grams fumaric acid (5.73 moles) and 712 grams of triethylene glycol (4.74 moles) were added to a 4-neck resin kettle equipped with stirrer, thermometer, gas inlet tube and water separator surmounted by a reflux condenser. The air in the reaction vessel was replaced by dropping lumps of Dry Ice into the reaction vessel and allowing the Dry Ice to evaporate. Nitrogen gas was then passed over the surface of the reactants. The reaction mixture was heated to 165° C. in about ½ hour. The temperature was allowed to rise to 197° C. during the course of 1½ hours while 150 ml. of water was collected in the water separator. Then 260 mgm. hydroquinone, 81.2 grams of trimethylol ethane (0.677 mole) and 50 grams of tetrahydrofurfuryl alcohol (0.49 mole) were added to the reaction vessel. Heating was maintained at about 200° C. until the polyester had an acid number of 27 and approximately 200 ml. of water had been collected in the water separator. After the polyester was cooled to about 100° C., 559 grams of styrene were added to the polyester.

The refractive index of the separated water indicated that about 10% or 5 grams of the tetrahydrofurfuryl had been entrained in the water and had not been esterified.

The hydroxyl equivalents provided by the hydroxyl components of the polyester were as follows, with allowance for 10% loss of tetrahydrofurfuryl alcohol:

| | Eq. percent |
|---|---|
| Triethylene glycol | 79.3 |
| Trimethylol ethane | 17.0 |
| Tetrahydrofurfuryl alcohol | 3.7 |

Samples of this polyester lacquer were stored in a freezer at −10° C. for over eighteen months without the lacquer setting up.

One hundred grams of the above polyester lacquer (70 parts polyester and 30 parts styrene) was compounded with 10 g. styrene, 1 gram of a 1% solution of cobalt metal as the octoate in 5 grams styrene, 1 g. 10% solution of ½ sec. cellulose acetate butyrate leveler in n-butyl acetate and 2 g. of a 60% solution of methyl ethyl ketone peroxide in dimethyl phthalate into a suitable air drying polyester lacquer and then applied as a 7 mil film to a glass plate with a Gardner knife applicator. The polyester was dust dry in 65 minutes and had a Hoffman Scratch Hardness of 1100–1200 after 63 days.

*Examples II–XI*

A series of storage-stable, air-drying polyester lacquers were prepared by the method of Example I using a OH:COOH ratio of 1.05:1 except that the distribution of hydroxyl equivalents in the polyesters was varied as set forth below in Table I (allowance being made for 10% loss of tetrahydrofurfuryl alcohol in the condensation reaction).

TABLE I

| Example | Distribution of OH Eq. in Polyester, percent | | | Acid Number of Polyester | Dust-Free Dry Time in Minutes | Hoffman Scratch Hardness of Polyester Film in gms. (Age of Film in Days) |
|---|---|---|---|---|---|---|
| | TEG[1] | TME[2] | THFA[3] | | | |
| II | 94.1 | 5.0 | 0.9 | 27 | 93 | 1,300 (67) |
| III | 93.4 | 5.0 | 1.6 | 28 | 65 | 1,300 (45) |
| IV | 92.4 | 4.9 | 2.7 | 26 | 63 | 1,400 (60) |
| V | 87.5 | 8.9 | 3.6 | 30 | 53 | 1,300 (100) |
| VI | 87.1 | 10.9 | 2.0 | 29 | 63 | 1,300 (60) |
| VII | 85.7 | 10.7 | 3.6 | 27 | 65 | 1,400 (60) |
| VIII | 83.6 | 10.4 | 6.0 | 29 | 64 | 1,200 (60) |
| IX | 79.4 | 17.0 | 3.6 | 29 | 46 | 1,200 (45) |
| X | 77.7 | 16.7 | 5.6 | 29 | 55 | 1,200 (45) |
| XI | 74.4 | 16.0 | 9.6 | 29 | 51 | 1,200 (45) |

[1] TEG stands for triethylene glycol.
[2] TME stands for trimethylol ethane.
[3] THFA stands for tetrahydrofurfuryl alcohol.

The above table indicates that the dust-free dry time of the polyester lacquers of this invention decreases as the concentration of tetrahydrofurfuryl alcohol and polyhydric alcohol containing at least three free hydroxyl groups increases. It is notable that, even in the most severe case, the dust-dry time was but a little more than 1½ hours.

*Examples XII–XVII*

A series of storage-stable, air-drying polyesters were prepared from 57.3 moles triethylene glycol, 3.9 moles trimethylol ethane, 5.2 moles monohydric alcohol and 65 moles fumaric acid. The polyesters were prepared by the method of Example I except that the time at which the trimethylol ethane and tetrahydrofurfuryl alcohol were added to the reaction vessel was varied as set forth below in Table II. The polyester was formulated into a suitable air drying lacquer (70 parts polyester and 30 parts styrene) in the manner described in Example I using 4 parts of 60% active methylethyl ketone peroxide and then applied as a 7 mil film to a glass plate.

Each of the air drying lacquers (70/30 composition) was also diluted with styrene until the lacquer became cloudy.

TABLE II

| Example | Point at Which Reagents Added to the Reaction Mass | | Percent THFA Entrained in Water of Condensation | Grams Styrene Added Before Lacquer Became Cloudy | Dust-Free Dry Time in Minutes |
|---|---|---|---|---|---|
| | THFA | TME | | | |
| XII | Start | Start | 33 | 164 | 38 |
| XIII | 25 H | do | 20 | 208 | 60 |
| XIV | 80 H | do | 10 | 244 | 52 |
| XV | 50 H | 50 H | 15 | 234 | 54 |
| XVI | 85 H | 75 H | 15 | 234 | 58 |
| XVII | 85 H* | 75 H | 10 | 264 | 70 |

H stands for percent of water which had been removed from the esterification reaction prior to the addition of reactant.
*Means that 1.3 moles THFA and 3.9 moles monoethoxy diethylene glycol (ethyl carbitol) were used in this example.

The above data indicates that (1) the earlier the addition of tetrahydrofurfuryl alcohol to the esterification reaction the higher the loss of tetrahydrofurfuryl alcohol, (2) as the concentration of monohydric alcohol in the polyester drops, the compatibility of the polyester (dilution) with styrene decreases and (3) the partial replacement of tetrahydrofurfuryl alcohol by another monohydric alcohol results in the polyester lacquer having poorer dust-free drying properties.

*Examples XVIII–XXXI*

A number of storage-stable, air-drying polyester lacquers were prepared by the method of Example I using a 1.05 to 1.0 ratio of OH to COOH. The components making up the polyester are set forth below in Table III.

Thirty parts by weight of each of the polyester lacquers (70% by weight polyester and 30% by weight styrene) was compounded with 3 parts styrene, 1 gram of a 1% solution of cobalt metal as the octoate in 5 grams styrene, 3% by weight methyl ethyl ketone peroxide (60% active) and 0.75% by weight ½ sec. cellulose acetate butyrate in n-butyl acetate. The polyester was then applied as a 7 mil film to a glass plate with a Gardner knife applicator and allowed to dry. The results are set forth below in Table III.

TABLE III

| Example | OH Equivalents | COOH Equivalents | Dust-Free Dry Time in Minutes | Hoffman Scratch Hardness (Age of film in days) |
|---|---|---|---|---|
| XVIII | 80.0% Triethylene glycol<br>17.1% Trimethylol propane<br>2.9% Tetrahydrofurfuryl alcohol | 100% Fumaric acid | 25 | 1200(77) |
| XIX | 80.0% Triethylene glycol<br>15.5% Trimethylol ethane<br>1.6% Hydrogenated Castor Oil<br>2.9% Tetrahydrofurfuryl alcohol | do | 31 | 1200(77) |
| XX | 80.0% Triethylene glycol<br>17.0% 1,2,6-hexanetriol<br>3.0% Tetrahydrofurfuryl alcohol | do | 37 | 1300(28) |
| XXI | 79.9% Triethylene glycol<br>14.8% Trimethylol ethane<br>2.1% Pluracol SP 560 [1]<br>3.2% Tetrahydrofurfuryl alcohol | do | 41 | 1200(28) |
| XXII | 80.0% Triethylene glycol<br>17.1% Trimethylol ethane<br>2.9% Tetrahydrofurfuryl alcohol | 50% Fumaric acid<br>50% Maleic anhydride | 43 | 1500(34) |
| XXIII | 80.0% Triethylene glycol<br>17.1% Trimethylol ethane<br>2.9% Tetrahydrofurfuryl alcohol | 25% Fumaric acid<br>75% Maleic anhydride | 63 | 1300(34) |
| XXIV | 79.4% Triethylene glycol<br>17.6% Trimethylol ethane<br>3.0% Tetrahydrofurfuryl alcohol | 90% Fumaric acid<br>10% 4-cyclohexene-2,2-dicarboxylic acid anhydride | 49 | 1100(43) |
| XXV | 79.4% Triethylene glycol<br>17.6% Trimethylol ethane<br>3.0% Tetrahydrofurfuryl alcohol | 89% Fumaric acid<br>11% Bicyclo (2,2,1)-5-heptene-2,3 dicarboxylic acid anhydride | 49 | 1100(43) |
| XXVI | 70.8% Triethylene glycol<br>17.0% Diethylene glycol<br>8.8% Trimethylol ethane<br>3.4% Tetrahydrofurfuryl alcohol | 100% Fumaric acid | 51 | 1000(160) |
| XXVII | 69.9% Triethylene glycol<br>17.6% Neopentyl glycol<br>9.0% Trimethylol ethane<br>3.6% Tetrahydrofurfuryl alcohol | do | 63 | 1200(60) |
| XXVIII | 80% Triethylene glycol<br>17.1% Trimethylol ethane<br>2.9% Tetrahydrofurfuryl alcohol | 90% Fumaric acid<br>10% Adipic acid | 44 | 1200(45) |
| XXIX | 76.0% Triethylene glycol<br>4.0% Propylene glycol<br>17.1% Trimethylol ethane<br>2.9% Tetrahydrofurfuryl alcohol | 95% Fumaric acid<br>5% Adipic acid | 41 | 1100(45) |
| XXX | 80.0% Triethylene glycol<br>17.1% Trimethylol ethane<br>2.9% Tetrahydrofurfuryl alcohol | 98% Fumaric acid<br>2% Empol 1018 [2] | 41 | 1200(77) |
| XXXI | 87.0% Triethylene glycol<br>9.0% Trimethylol ethane<br>4.0% Tetrahydropyranyl-2-methanol | 100% Fumaric acid | 78 | 1200(90) |

[1] Pluracol SP 560 is a hydroxypropylated sorbitol.  [2] Empol 1018 is dimerized oleic acid containing some trimer.

Example XXXII

A polyester was prepared by the method of Example I using a 1.05 to 1 ratio of OH to COOH. All of the carboxyl groups were furnished by fumaric acid, while the hydroxyl equivalents were as follows:

77.3% tetraethylene glycol
15.8% trimethylol ethane
6.9% tetrahydrofurfuryl alcohol A polyester lacquer was applied to a glass plate in the manner described in Example I. The film had a Hoffman Scratch Hardness of 1200 after 90 days.

Example XXXIII

A polyester was prepared by the method of Example V except that, after essentially all the water of reaction had been removed, a sufficient concentration of anthracene was added to polyesterification reaction to furnish 1 mole of anthracene per each 20 moles of fumaric acid. A polyester lacquer was prepared as described in Example I and was applied as a 7 mil film to a glass plate. The polyester lacquer had a 61-minute dust-free dry time, and the film had a Hoffman Scratch Hardness of 1300 grams after 60 days.

Example XXXIV

Example XXXIII was repeated except that the anthracene was replaced by an equivalent amount of dicyclopentadiene. The polyester lacquer had a 46-minute dust-free dry time and the film had a Hoffman Scratch Hardness of 1200 grams after 60 days.

Example XXXV

This example illustrates the excellent storage stability of flatted and semi-flatted polyester lacquers of this invention. Each of the polyester lacquers to be tested was formulated into a flatting paste by milling twice on a three-roll mill 55 parts of the polyester lacquer to be tested (70 parts polyester and 30 parts styrene), 17 parts styrene and 22 parts silica flatting agent (Syloid 308). The milled product was then diluted with 6 parts ethyl acetate. Flat formulations were then prepared by compounding 45 parts of the proper flatting paste, 35 parts of the polyester lacquer to be tested, 6 parts of a 1% solution of cobalt octoate in styrene, 2 parts of a 10% ½ sec. cellulose acetate butyrate in n-butyl acetate and 8 parts styrene.

Semi-flat formulations were prepared by decreasing the flatting paste to 32 parts and increasing the proportion of polyester lacquer to 48 parts.

The storage stability of the samples is set forth below in Table IV.

TABLE IV

| Polyester Tested | Formulation | Storage Stability in Days at— | |
|---|---|---|---|
| | | 120° F. | 77° F. |
| Polyester of Example V | Flat | 13 | >360 |
| | Semi-flat | 14 | >360 |
| Bayer Roskydal 500 [1] | Flat | 6 | 110 |
| | Semi-flat | 7 | 155 |

[1] Bayer Roskydal 500 is considered to be the sales leader in air-drying polyesters in the U.S. and in Europe. It is based on allyl ethers of polyhydric alcohols.

Example XXXVI

A quart of pink pigmented high gloss polyester lacquer was prepared by milling twice on a three-roll mill 600 grams of the polyester lacquer of Example I (70 parts polyester and 10 parts styrene), 156 grams Rutile titanium dioxide and 84 grams C. P. Cadmium Med. Red #300 and then adding 150 grams styrene, 36 grams of a 1% cobalt octoate in styrene and 18 grams of a 10% ½ sec. cellulose acetate butyrate in n-butyl acetate. The lacquer was strained and then ½ quart of the lacquer was stored in a quart container. The polyester had not set up after over 10 months storage. The large head space in the container makes this a particularly severe test of the storage stability of the pigmented polyester lacquer.

Essentially the same results were obtained using various other pigments, such as mixtures of Phthalocyamine Blue Lake and titanium dioxide, with the polyester of Example V.

Since many embodiments of this invention may be made and since many changes may be made in the embodiments described, the foregoing is to be interpreted as illustrative only and my invention is defined by the claims appended hereafter.

I claim:
1. A polyester of (1) dicarboxylic acid component, (2) monohydric alcohol, which provides from 0.5 to 15% of the hydroxyl groups available for esterification, (3) dihydric alcohol, which provides from 65 to 97.5% of the hydroxyl groups available for esterification, and (4) polyhydric alcohol containing at least 3 hydroxyl groups, which provides from 2 to 20% of the hydroxyl groups available for esterification, wherein (1) at least 80 mole percent of said dicarboxylic acid component comprises an alpha, beta-ethylenically unsaturated alpha, beta-dicarboxylic acid, (2) said monohydric alcohol comprises a compound selected from the group consisting of tetrahydrofurfuryl alcohol and tetrahydropyranyl-2-methanol, (3) at least 75 mole percent of said dihydric alcohol conforms to the structure $HO(CH_2CH_2O)_nH$ wherein $n$ is a number from 3 to 6 inclusive.

2. The polyester of claim 1, wherein the monohydric alcohol comprises tetrahydrofurfuryl alcohol.

3. The polyester of claim 2, wherein said dihydric alcohol comprises triethylene glycol.

4. The polyester of claim 3, wherein said polyhydric alcohol containing at least 3 hydroxyl groups is a trihydric alcohol.

5. The polyester of claim 4, wherein said trihydric alcohol is selected from the group consisting of trimethylol ethane and trimethylol propane.

6. The polyester of claim 4, wherein all of said alpha, beta-ethylenically unsaturated alpha, beta-dicarboxylic acid is fumaric acid.

7. A polyester composed of (1) fumaric acid, (2) tetrahydrofurfuryl alcohol, which provides from 0.5 to 15% of the hydroxyl groups available for esterification, (3) triethylene glycol, which provides from 65 to 97.5% of the hydroxyl groups available for esterification, and (4) trihydric alcohol selected from the group consisting of trimethylol propane and trimethylol ethane, which provides from 2 to 20% of the hydroxyl groups available for estertification.

8. A polyester lacquer comprising a vinyl aromatic component and a polyester of (1) dicarboxylic acid component, (2) monohydric alcohol, which provides from 0.5 to 15% of the hydroxyl groups available for esterification, (3) dihydric alcohol, which provides from 65 to 97.5% of the hydroxyl groups available for esterification, and (4) polyhydric alcohol containing at least three hydroxyl groups, which provide from 2 to 20% of the hydroxyl groups available for esterification, wherein (1) at least 80 mole percent of said dicarboxylic acid component comprises an alpha, beta-ethylenically unsaturated alpha, beta-dicarboxylic acid, (2) said monohydric alcohol comprises a compound selected from the group consisting of tetrahydrofurfuryl alcohol and tetrahydropyranyl-2-methanol, and (3) at least 75 mole percent of said dihydric alcohol conforms to the structure $$HO(CH_2CH_2O)_nH$$

wherein $n$ is a number from 3 to 6 inclusive.

9. The composition of claim 8, wherein said vinyl aromatic component comprises styrene.

10. The composition of claim 8, wherein said polyester lacquer contains a flatting agent.

11. The composition of claim 8, wherein said polyester lacquer contains a silica flatting agent.

12. The composition of claim 8, wherein said monohydric alcohol comprises tetrahydrofurfuryl alcohol.

13. The composition of claim 12, wherein said dihydric alcohol comprises triethylene glycol.

14. The composition of claim 13, wherein said polyhydric alcohol is a triol selected from the group consisting of trimethylol propane and trimethylol ethane.

15. The composition of claim 13, wherein all of said alpha, beta-ethylenically unsaturated alpha, beta-dicarboxylic acid is fumaric acid.

16. A polyester lacquer comprising a vinyl aromatic component and a polyester composed of (1) fumaric acid, (2) tetrahydrofurfuryl alcohol, which provides from 0.5 to 15% of the hydroxyl groups available for esterification, (3) triethylene glycol, which provides from 65 to 97.5% of the hydroxyl groups available for esterification and (4) trihydric alcohol selected from the group consisting of trimethylol ethane and trimethylol propane, which provides from 2 to 20% of the hydroxyl groups available for esterification.

17. The polyester lacquer of claim 16, wherein the vinyl aromatic component comprises styrene.

18. The polyester lacquer of claim 16, wherein said polyester lacquer contains a flatting agent.

19. The polyester lacquer of claim 16, wherein said polyester lacquer contains a silica flatting agent.

References Cited by the Examiner

UNITED STATES PATENTS

| | | | |
|---|---|---|---|
| 2,319,575 | 5/1943 | Agens | 260—77 |
| 3,042,548 | 7/1962 | Aikens | 260—40 |

OTHER REFERENCES

Payne "Organic Coating Technology," vol. 1, John Wiley and Sons, 1954 (Pages 269–271 relied on).

MORRIS LIEBMAN, *Primary Examiner.*

A. H. KOECKERT, J. FROME, *Assistant Examiners.*